(12) United States Patent
Samson et al.

(10) Patent No.: US 7,343,502 B2
(45) Date of Patent: Mar. 11, 2008

(54) METHOD AND APPARATUS FOR DYNAMIC DLL POWERDOWN AND MEMORY SELF-REFRESH

(75) Inventors: Eric C. Samson, Folsom, CA (US); Aditya Navale, El Dorado Hills, CA (US); Leslie E. Cline, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 10/899,530

(22) Filed: Jul. 26, 2004

(65) Prior Publication Data

US 2006/0020835 A1    Jan. 26, 2006

(51) Int. Cl.
*G06F 1/26*    (2006.01)
(52) U.S. Cl. ............... 713/320; 713/300; 713/330; 711/1; 711/100; 711/106
(58) Field of Classification Search ........... 713/300, 713/320, 323, 501, 330; 711/1, 100, 106
See application file for complete search history.

(56) References Cited

U.S. PATENT DOCUMENTS

| | | | |
|---|---|---|---|
| 4,485,440 A | 11/1984 | Duff et al. | |
| 5,021,679 A | 6/1991 | Fairbanks et al. | |
| 5,072,376 A | 12/1991 | Ellsworth | |
| 5,153,535 A | 10/1992 | Fairbanks et al. | |
| 5,307,003 A | 4/1994 | Fairbanks et al. | |
| 5,349,688 A | 9/1994 | Nguyen | |
| 5,404,543 A * | 4/1995 | Faucher et al. | 713/323 |
| 5,513,358 A | 4/1996 | Lundberg et al. | |
| 5,564,015 A | 10/1996 | Bunnell | |
| 5,623,647 A | 4/1997 | Maitra | |
| 5,625,806 A | 4/1997 | Kromer | |
| 5,627,412 A | 5/1997 | Beard | |
| 5,710,929 A | 1/1998 | Fung | |
| 5,719,800 A | 2/1998 | Mittal et al. | |
| 5,745,375 A | 4/1998 | Reinhardt et al. | |
| 5,752,011 A | 5/1998 | Thomas et al. | |
| 5,787,294 A | 7/1998 | Evoy | |
| 5,813,022 A | 9/1998 | Ramsey et al. | |
| 5,815,693 A | 9/1998 | McDermott et al. | |
| 5,825,674 A | 10/1998 | Jackson | |

(Continued)

FOREIGN PATENT DOCUMENTS

EP    0 978 781 A2    2/2000

(Continued)

OTHER PUBLICATIONS

PCT International Search Report (dated Dec. 7, 2005) International Application No. PCT/US2005/02475—International Filing Date Jul. 8, 2005) P16554PT (14 pages).

(Continued)

*Primary Examiner*—Thomas Lee
*Assistant Examiner*—Malcolm D Cribbs (57) ABSTRACT

Embodiments of the present invention provide a method and apparatus for conserving power in an electronic device. In particular, embodiments of the present invention dynamically place the memory in self-refresh and chipset clock circuits in power down mode while keeping the isochronous streams (such as display) updated and servicing bus master cycles in a power savings mode.

27 Claims, 5 Drawing Sheets

U.S. PATENT DOCUMENTS

| | | | |
|---|---|---|---|
| 5,963,023 A | 10/1999 | Herrell et al. | |
| 5,974,557 A | 10/1999 | Thomas et al. | |
| 5,982,814 A | 11/1999 | Yeh et al. | |
| 6,006,336 A | 12/1999 | Watts et al. | |
| 6,105,142 A | 8/2000 | Goff et al. | |
| 6,108,226 A | 8/2000 | Ghosh et al. | |
| 6,118,306 A | 9/2000 | Orton et al. | |
| 6,128,747 A * | 10/2000 | Thoulon | 713/330 |
| 6,141,765 A | 10/2000 | Sherman | |
| 6,192,479 B1 | 2/2001 | Ko | |
| 6,212,644 B1 | 4/2001 | Shimoda et al. | |
| 6,216,235 B1 | 4/2001 | Thomas et al. | |
| 6,272,642 B2 | 8/2001 | Pole, II et al. | |
| 6,298,105 B1 | 10/2001 | Dai et al. | |
| 6,347,379 B1 | 2/2002 | Dai et al. | |
| 6,351,150 B1 | 2/2002 | Krishnamurthy et al. | |
| 6,470,456 B1 | 10/2002 | Chung-Chih | |
| 6,487,668 B2 | 11/2002 | Thomas et al. | |
| 6,519,706 B1 | 2/2003 | Ogoro | |
| 6,535,798 B1 | 3/2003 | Bhatia et al. | |
| 6,557,108 B1 | 4/2003 | Moore et al. | |
| 6,574,739 B1 | 6/2003 | Kung et al. | |
| 6,633,987 B2 * | 10/2003 | Jain et al. | 713/300 |
| 6,738,675 B2 | 5/2004 | Dai | |
| 6,820,209 B1 * | 11/2004 | Culbert et al. | 713/501 |
| 6,829,713 B2 | 12/2004 | Cooper et al. | |
| 6,941,480 B1 | 9/2005 | Dai | |
| 2001/0029566 A1 | 10/2001 | Shin | |
| 2003/0115428 A1 | 6/2003 | Zaccarin et al. | |
| 2003/0210247 A1 | 11/2003 | Cui et al. | |
| 2004/0139359 A1 * | 7/2004 | Samson et al. | 713/320 |
| 2005/0022038 A1 | 1/2005 | Kaushik et al. | |

FOREIGN PATENT DOCUMENTS

| | | | |
|---|---|---|---|
| EP | 1 115 051 A1 | | 7/2001 |
| EP | 1 369 767 | * | 10/2003 |
| EP | 1 369 767 A2 | | 12/2003 |

OTHER PUBLICATIONS

Hamilton, Anthony, U.S. Appl. No. 09/677,261 filed Sep. 30, 2000.

Intel Corporation, "IA-32 Processors and Related Products Databook"; Chapter 1; pp. 1-11-1-20; Mar. 1999.

Intel Corporation, "IA-32 Processors and Related Products Databook"; Appendix A; pp. 1-53-1-69; Mar. 1999.

Intel Corporation, "IA-32 Processors and Related Products Databook"; Chapter 7; pp. 7-161-7-224; Mar. 1999.

Intel Corporation, "Intel Architecture Software Developer's Manual; vol. 1: Basic Architecture"; Chapter 2; pp. 2-1-2-14; 1999.

Intel Corporation, "Mobile Intel® Pentium® 4 Processors—M: Enhanced Intel SpeedStep® Technology"; 3 pages; Dec. 9, 2003.

Intel Corporation, "Mobile Intel® Pentium® III Processors—M: Intel SpeedStep® Technology"; 3 pages; Dec. 9, 2003.

Intel Corporation, "Mobile Intel® Pentium® 4 Processor—M: Datasheet"; 97 pages; Jun. 2003.

Youngsoo Shin et al., "Power Conscious Fixed Priority Scheduling for Hard Real-Time Systems," Proceedings of the 36th Design Automation Conference, pp. 134-139, Jun. 21, 1999.

* cited by examiner

METHOD AND APPARATUS FOR DYNAMIC DLL POWERDOWN AND MEMORY SELF-REFRESH

BACKGROUND

Computing devices, particularly portable devices, are frequently limited by the amount of time that they can run on battery power without reconnection to an AC power supply. Thus, there is a continuous effort to reduce the power consumption of various components of computers, including the central processing unit. Keeping electronic devices such as a central processing unit, a memory controller or a memory in their lowest possible power state provides a number of benefits. For example, it allows battery-operated machines to operate for longer periods of time between recharging. A reduction in power consumption also reduces thermal dissipation by the central processing unit. Reduced thermal dissipation allows the central processing unit to run at full speed for longer periods of time, while remaining within its thermal dissipation specifications. Reduced thermal dissipation also reduces the need for fans and other components used to prevent heat build-up in a computer.

A standard specification used in developing power management systems is the advanced configuration and power interface (ACPI) specification (for example, rev. 2.0 dated Jul. 27, 2000; see also ACPI Component Architecture Programmer Reference, rev. 1.05 dated Feb. 27, 2001 available from Intel Corporation of Santa Clara, Calif.). One goal of the ACPI is to enhance power management functionality and robustness, as well as facilitating industry wide implementation of common power management features.

The ACPI defines a number of processor power states that are processor power consumption and thermal management states within a global working state. These processor states include a (i) CØ power state, (ii) C1 power state, (iii) C2 power state, and (iv) C3 power state. In the CØ power state, the processor executes instructions and is at full power. In the C1 and C2 power states, the processor is in a non-executing power state. However, the C2 power state uses less power than the C1 state. In the C1 and C2 power state, the processor still allows the bus to snoop the processor cache memory and thereby maintain cache coherency. The C3 power state offers improved power savings over the C1 and C2 power states, but at the cost of higher power down exit latency to memory.

In conventional systems, the power management logic causes the CPU to transition from a C2 power state back to a high-powered CØ power state under certain circumstances. Keeping the electronic device in a lower power state than could otherwise be achieved and reducing the number of transitions between power states improves system performance by reducing latencies caused by switching between designated power states, as well keeping the overall power consumption lower.

DETAILED DESCRIPTION

Embodiments of the present invention provide a method and apparatus for conserving power in an electronic device. In particular, embodiments of the present invention dynamically place the memory in self-refresh and chipset clock circuits in power down mode while keeping the display updated and servicing bus master cycles in a power savings mode, such as C2. Maintaining the processor in a power savings mode, such as C2, saves power and reduces the power difference between integrated and non-integrated graphics chipset platforms even when snoopable bus mastering cycles are occurring (unlike in the C3 state, for example).

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 1:
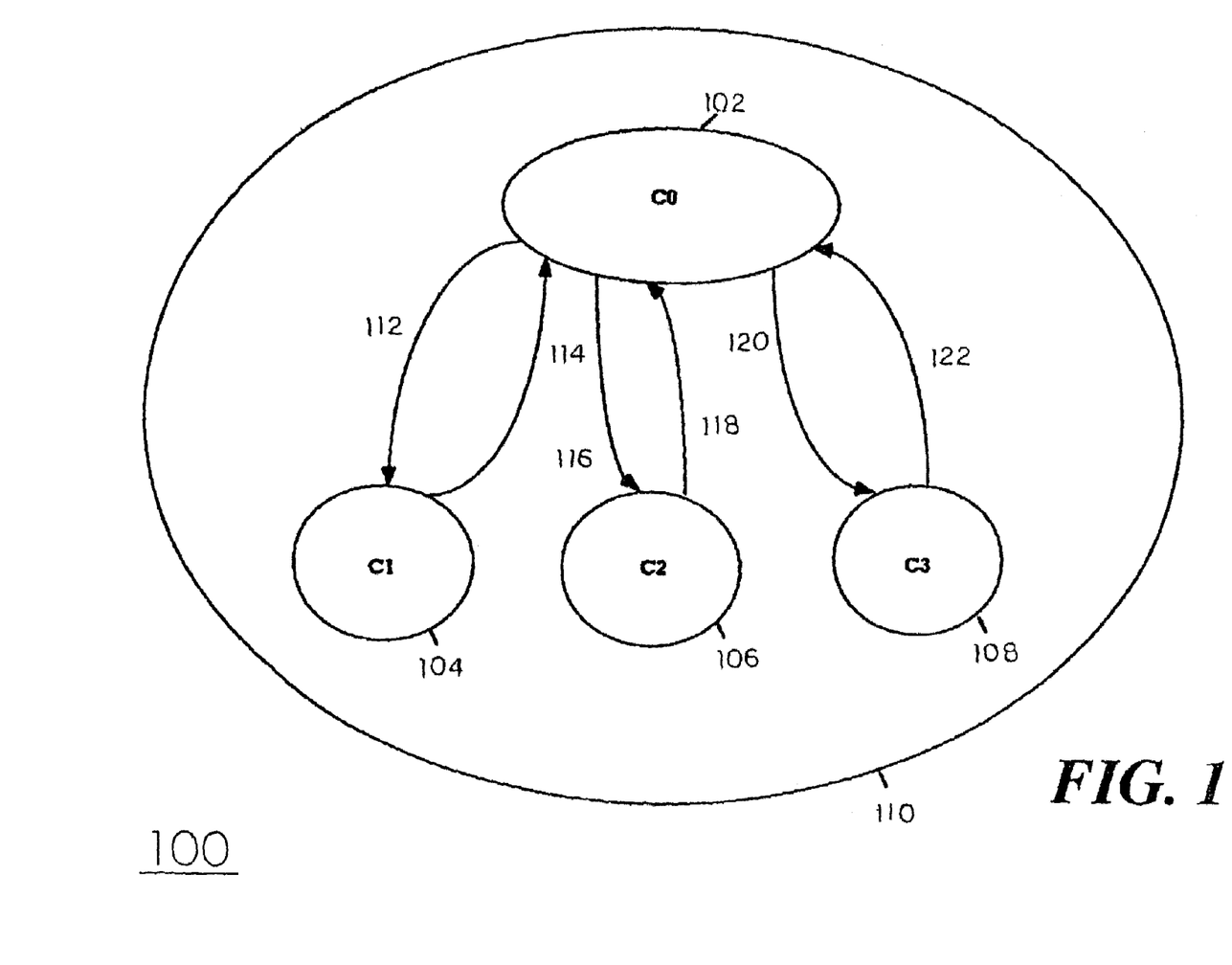
FIG. 1 illustrates a diagram of an embodiment of transitions between processor power states in the ACPI specification.

FIG. 1 illustrates a diagram of an embodiment 100 of transitions between processor power states in the ACPI specification. All states, the CØ state 102, the C1 state 104, the C2 state 106 and the C3 state 108 are encompassed within a GØ working state 110. A GØ working state is defined by the ACPI specification as a computer state where the system dispatches user mode (application) threads. In the GØ working state, these threads are executed. In this state, devices (peripherals) are dynamically having their power states changed. Within this GØ state 110, a processor transitions between various processor power states including the CØ state 102, the C1 state 104, the C2 state 106, and the C3 state 108.

In the CØ state 102, the processor is at full power. In this state, the components of a typical system are powered and the clocks in the system can run at full speed. The C1 state 104 defines a non-executing state in which the processor power state has the lowest latency.

The C2 state 106 is a second non-executing power state which offers improved power savings over the C1 state 104. The C2 state 106 is a common chipset mode while a computer is in a passive state (i.e. operating system idle) and connected to bus masters such as USB devices or audio ports. During the C2 state 106, discrete chipsets access memory primarily to service bus master cycles and integrated graphics chipsets access memory primarily to fetch display refresh data, service bus master cycles or continue graphics rendering. The CPU does not need to access memory. The DRAM memory operates in an extended power conservation mode, sometimes referred to as a stand-by mode, or self refresh. A refresh unit recharges electrical cells within DRAM memory in order to maintain data integrity.

The C3 power state 108 offers improved savings over both the C1 state 104, and the C2 state 106. While in the C3 state 104, the processor's caches maintain the current information state and snoops are not possible. The processor is brought back out to the C0, C1 or C2 states to handle snoopable traffic.

The transitions between states occur from the CØ state 102 along path 112 to the C1 state 104 and back to the CØ state 102 along return path 114. Transitions also occur from the CØ state 102 to the C2 state 104 along path 116 and return to the CØ state 104 along path 118. Finally, transitions occur from the CØ state 104 along path 120 to the C3 state 116 and return to the CØ state along path 122. CPU inactivity for a sufficient duration will trigger a transition from the CØ state 102 to the C2 state 104 along path 116. A break event such as an interrupt will result in a transition of the system from the C2 state 104 along a path 118 to the CØ state 102.

It should be recognized that although the description of this system will be described according to the ACPI specifications power states of CØ, C1, C2 and C3 for convenience, the invention is not limited by the ACPI specification. In general, for embodiments not following the ACPI specification, the CØ power state is defined for purposes of this invention as a full power state in which the CPU carries on its normal functions. The ACPI C2 power state is defined generally to be an intermediate power state between full power and the C3 power state. With an Intel processor, the C2 power state is equivalent to the STOP GRANT state. In general the C2 power state allows snooping memory accesses and maintaining cache coherency.

Figure 2:
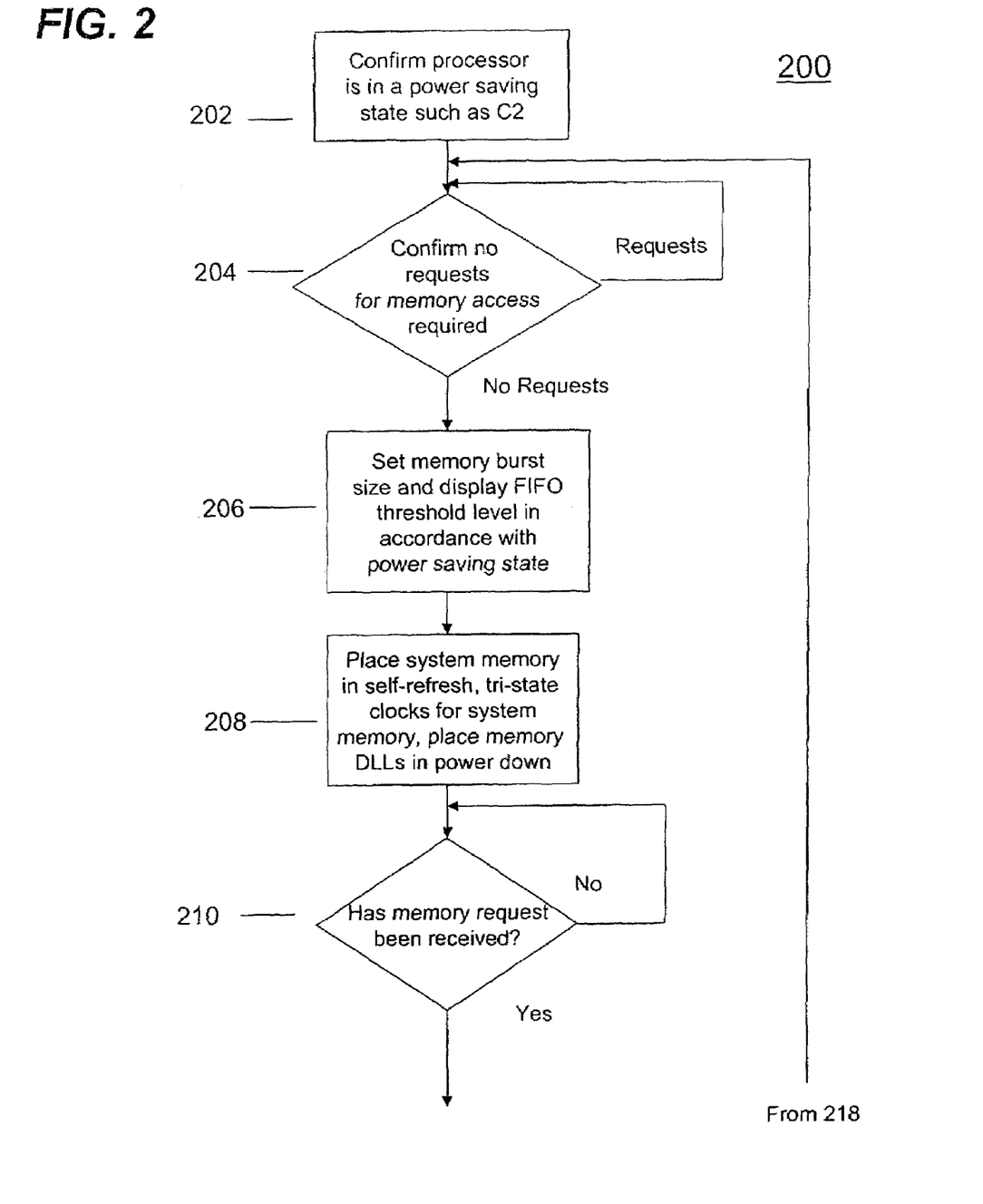
FIG. 2 illustrates a flow diagram of an embodiment of a routine for placing the memory in self-refresh and memory digital locked loops (DLLs) in power down mode while keeping the display updated and maintaining use of bus masters during the C2 power state for an integrated graphics configuration.

FIG. 2 illustrates a flow diagram of an embodiment 200 of a routine for placing the memory in self-refresh and DLLs in power down mode while keeping the display updated and maintaining use of bus masters during the C2 power state for an integrated graphics configuration. Embodiments of the present invention (1) place the memory in self-refresh during idle times, rather than just in precharge power down mode and/or (2) dynamically power down the DDR clocks/ DLLs. For purposes of this invention, this power savings state is referred to as "C2 self-refresh" even though more power savings are obtained than just memory going into self-refresh. In particular, since the other bus masters on the platform generally have very large latency tolerance compared to display, display updates can proceed properly as long as the buffering provided for display is sufficient to cover the maximum exit latency for memory to come out of self-refresh. If a non-isochronous bus master has started to do a very long burst to memory when a display request must be served, the completion of the bus master request can be postponed until after the display request has been serviced. As long as any isochronous streams (for example, isochronous audio) that must also get memory access are of sufficiently short burst sizes that they stay within the bounds of the other isochronous streams (for example, display) ability to handle latency, and as long as these streams request memory accesses at a rate lower than that required to exit memory self refresh, then the C2 self-refresh state can be enabled. Isochronous streams have the characteristic that their maximum burst sizes and minimum repetition rates are deterministic in the platform, so it is easy to know when the C2 self-refresh state is achievable.

In step 202, the processor is confirmed to be in the C2 power state.

In step 204, lack of memory requests from any source (bus master, display refresh) is confirmed.

Figure 3:
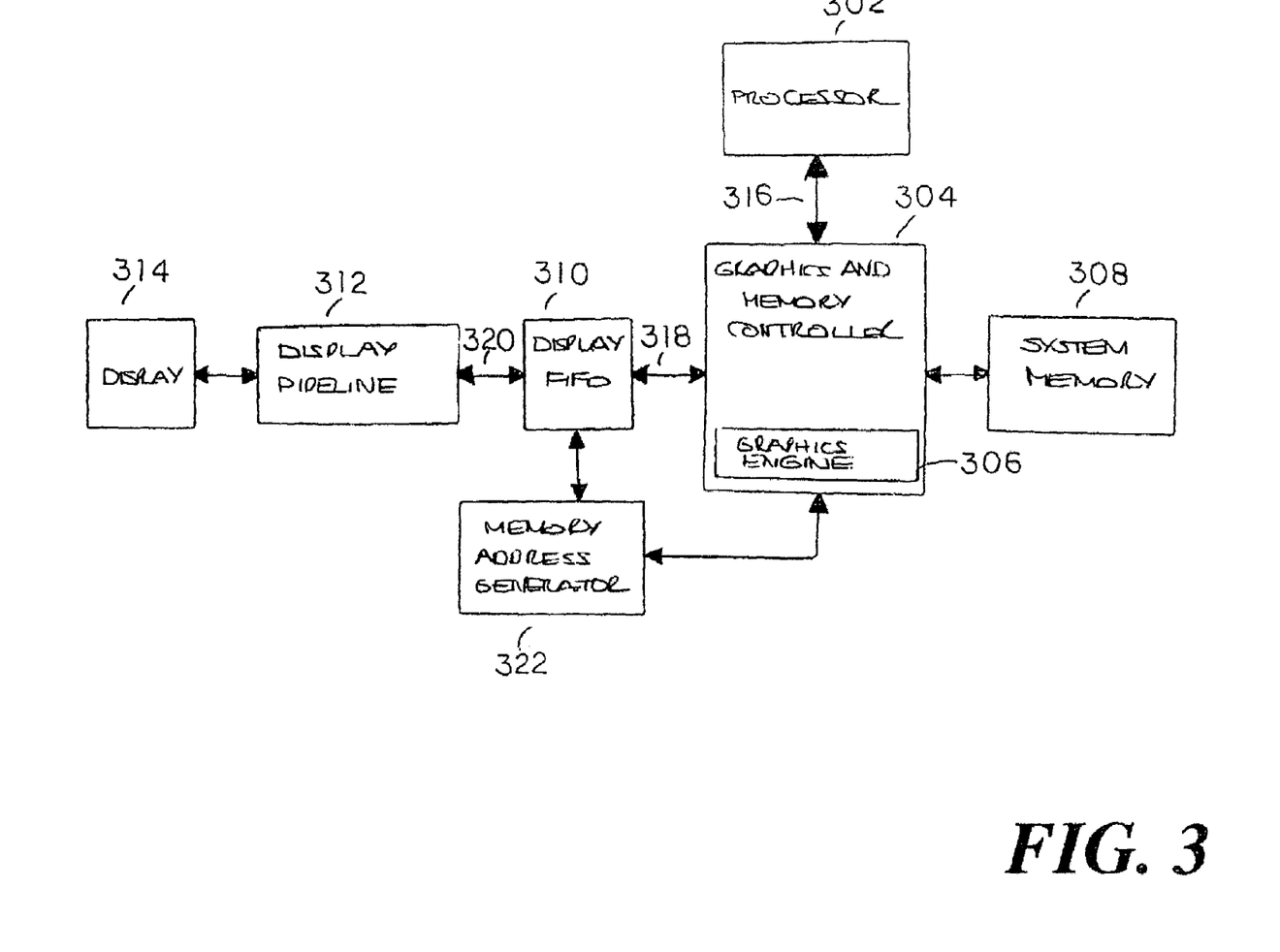
FIG. 3 is a diagram of an embodiment of an exemplary integrated graphics configuration for placing the memory in self-refresh and DLL in power down mode while maintaining use of bus masters and keeping the display updated during the C2 power state.
Figure 4A:
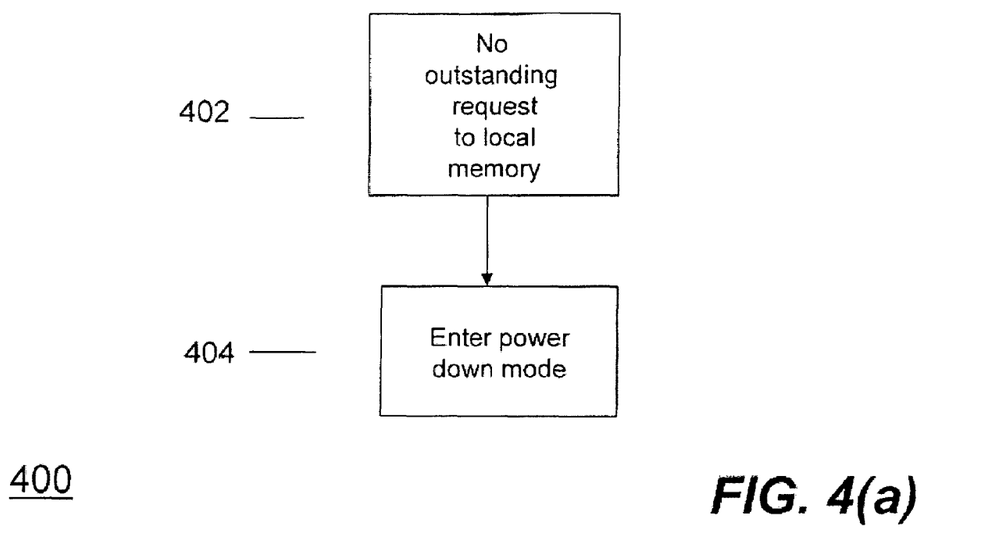
FIGS. 4(a) and (b) illustrate flow diagrams of embodiments of routines for placing the memory in self-refresh and DLLs in power down mode while maintaining use of bus masters during the C2 power state for a discrete configuration.
Figure 4B:
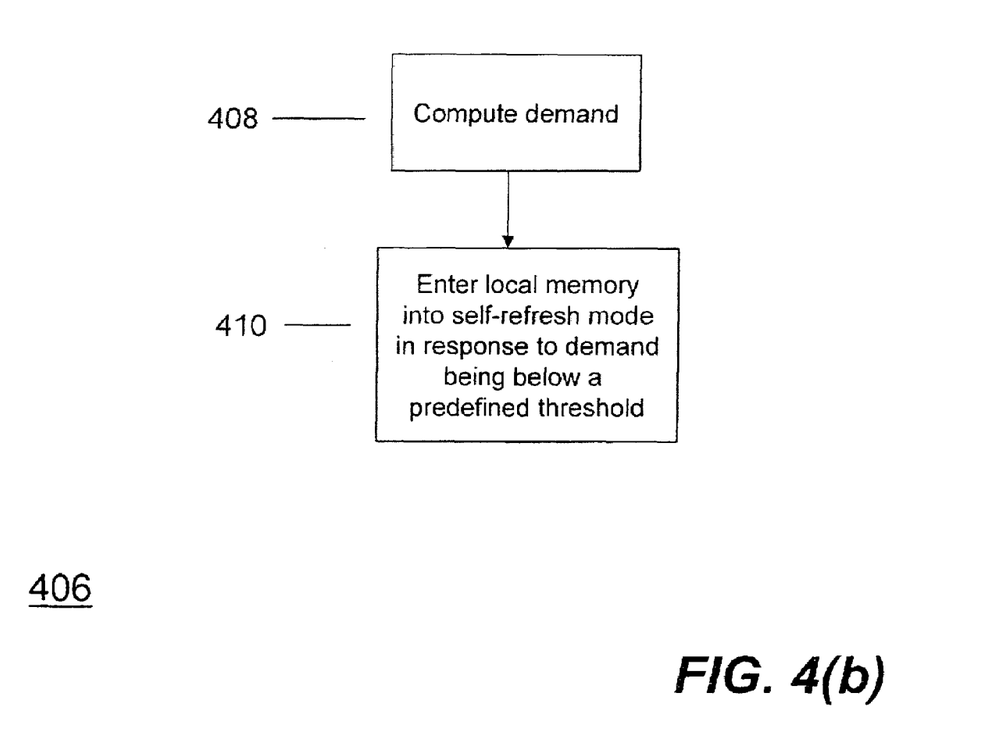

In step 206, the memory burst size and display FIFO threshold level are set to predefined levels conducive to the C2 power state. In particular, as shown in FIGS. 3 and 4 and discussed in detail below, the display FIFO has a threshold level that triggers a burst request when it is reached. The FIFO threshold value is set such that the memory bursts that are required for display refresh are large enough, and spaced far enough apart in time, so that substantial power down time in the C2 power state is possible before the DDR DLLs and chipset memory need to be re-enabled. In a typical configuration for an integrated graphics configuration, display logic manages a display FIFO. The threshold value is present in a threshold register. The threshold value is programmable and pre-set depending on the power savings mode. This can save power in limiting the number of memory transfers (each of which uses power) and can create idle periods during static display in which low-power devices can enter a power-savings mode. The request burst size and threshold level control the spacing in time of these requests.

A rendering engine is confirmed or forced to be idle. The chipset is generally in a state that provides opportunities for entering the self-refresh state when graphics rendering is not required or is completed.

In step 208, any or a combination of the following can occur: 1) system memory is placed in self-refresh with clocks and other memory control signals tri-stated for the system memory, 2) memory DLLs not needed during C2 self-refresh state can be placed in power down and/or 3) any other functional block and clock trees that are not needed during C2 self-refresh state can be placed in power down. The decision about which functions can be powered down is dependent on decision logic including comparing impact to powerdown exit latency of the powerdown features versus time available. The time available depends on the maximum latency tolerated by the display and the isochronous stream periodicity and burst size requirements.

Memory DLLs may be placed in power down mode. In particular, integrated circuits such as DDR DRAMs often generate a plurality of synchronized DLL outputs (phases) and utilize a plurality of operation modes, such that the output signals produced by a circuit such as a DLL are selectively applied to circuits in the device to reduce unnecessary power consumption. In a typical implementation, the power management unit controls a clock generator that clocks other chips in the system, such as the processor, memory controller and memory. Integrated circuits, such as DDR DRAMS, typically include DLLs that provide distributed signals, e.g., clock signals, to multiple circuits. A DLL typically receives a reference clock signal from which it generates an internal clock signal, the phase of which typically depends on the reference clock signal. DLLs are of some complexity and operate at high frequency, hence consume significant power. It may be desirable to operate a large number of circuits in synchronism with such an internal clock signal. If these circuits are driven in common, the total output load on the DLL can be very large, causing the DLL to consume a large amount of power. Thus, it is advantageous to power down the DLLs.

In step 210, until a bus master request and/or display refresh is confirmed, the self-refresh and dynamic DLL power down remains intact.

In step 212, in response to confirmation that a bus master and/or display refresh request has been executed, the system memory clock is enabled and the system memory placed in an idle mode.

In step 214, the DLLs are powered up. The chipset DLL associated with the memory being used to update display refresh will optionally be kept enabled during the C2 state.

In step 216, the system waits until the DLLs and system memory are both powered up.

In step 218, the next memory burst is executed and the routine returns to step 204. The processor remains in the C2 power state as long as there is not a break event (for example, an interrupt).

In typical implementations, the processor clock is restarted or signal to the processor de-asserted to accomplish the transition. The memory burst size and watermark levels are then set in accordance with the CØ power state requirements. During operation in the full power state, such as CØ, the memory bursts are generally smaller and spaced much closer in time, in accordance with the CØ power state. The CØ state imposes a display FIFO size that is large enough to encompass the new C2 burst size and threshold level requirements of this invention.

The above-described method of handling bus requests while the processor is in a low power state may be accomplished by a variety of different apparatus as described in detail below.

For example, FIG. 3 is a diagram of an embodiment of an integrated graphics configuration for placing the memory in self-refresh and DLL in power down mode while maintaining use of bus masters and keeping the display updated during the C2 power state, as illustrated in FIG. 2. A computer system includes processor 302, graphics and memory controller 304 including graphics engine 306, memory 308, display FIFO 310, display pipeline 312 and display device 314. Processor 302 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 302 may be coupled to common bus 316 that transmits data signals between processor 302 and other components in the system.

Processor 302 issues signals over common bus 316 for communicating with memory 308 or graphics and memory controller 304 in order to manipulate data as described herein. Processor 302 issues such signals in response to software instructions that it obtains from memory 308. Memory 308 may be a dynamic random access memory (DRAM) device, a static random access memory (SRAM) device, or other memory device. Memory 308 may store instructions and/or data represented by data signals that may be executed by processor 302, graphics engine 306 or some other device. The instructions and/or data may comprise code for performing any and/or all of the techniques of the present invention. Memory 308 may also contain software and/or data. An optional cache memory may be used to speed up memory accesses by the graphics engine 306 by taking advantage of its locality of access. In some embodiments, graphics engine 306 can offload from processor 302 many of the memory-intensive tasks required for rendering an image. Graphics engine 306 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics engine 306 may be coupled to common bus 316 that transmits data signals between graphics engine 306 and other components in the system, including render cache 310 and display device 314. Graphics engine 306 includes rendering hardware that among other things writes specific attributes (e.g. colors) to specific pixels of display 314 and draw complicated primitives on display device 314. Graphics and memory controller 304 communicates with display device 314 for displaying images rendered or otherwise processed by a graphics controller 304 for displaying images rendered or otherwise processed to a user. Display device 314 may comprise a computer monitor, television set, flat panel display or other suitable display device.

Memory 308 stores a host operating system that may include one or more rendering programs to build the images of graphics primitives for display. The system includes graphics engine 306, such as a graphics accelerator that uses customized hardware logic device or a co-processor to improve the performance of rendering at least some portion of the graphics primitives otherwise handled by host rendering programs. The host operating system program and its host graphics application program interface (API) control the graphics engine 306 through a driver program.

FIFO 310 receives display data from graphics and memory controller 304 through data bus 318 and outputs display data to display pipeline 312 through data bus 320. Graphics and memory controller 304 decides which one of the devices should be granted access to memory 308. A part of the graphics engine controls block transfer of images to, from or within the memory 308. A memory address generator 322 is connected to graphics and memory controller 304 and display FIFO 310. The memory address generator 322 generates memory addresses to the graphics and memory controller 304. Graphics and memory controller 304 controls memory address generator 322 and display pipeline 312. The graphics and memory controller 304 instructs the memory address generator 322 when to start loading the FIFO 310. Display FIFO 310 is used for receiving and storing display data for the display device 314.

When the FIFO level is greater than the threshold value, a memory burst request for a non-display stream can be generated without harming display. Based upon the comparison of the FIFO data level against the threshold values, a control circuit issues a request to graphics and memory controller 304 for memory access so that data can be loaded into FIFO 310.

FIGS. 4(a) and (b) illustrate flow diagrams of embodiments of routines for placing memory in self-refresh and DLLs in power down mode while maintaining use of bus masters during the C2 power state for a discrete configuration. A discrete chipset configuration has no graphics, and can put memory in self refresh as long as the isochronous constraints (i.e, isochronous periodicity must be greater than the powerdown exit latency) are met. A discrete graphics controller has a display stream to maintain. But a discrete graphics controller has no knowledge of C2 state.

Referring to FIG. 4(a), in one embodiment 400, the discrete graphics controller enters its local memory related powerdown modes such as self refresh state (for reference purposes, called the graphics c2 power state) (step 404) whenever there are no outstanding requests to local memory (step 402).

Referring to FIG. 4(b), in another embodiment 406, a discrete graphics controller computes the demand based on bandwidth threshold and/or duration of local memory request idleness on its local memory (step 408). In response to the demand being sufficiently low, it enters its local memory into self-refresh (step 410).

Having described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. A method for conserving power in an, electronic device, comprising:
   determining that a processor is in a power saving state;
   placing a memory, coupled to the processor, in a self-refresh mode, when it is determined that the processor is in the power saving state, in response to confirming that there are no memory access;
   keeping isochronous data updated and servicing bus mater data in the reduced power mode; and
   determining whether a combination of the isochronous and bus master data exceeds a predefined buffering threshold; and placing the memory in the self-refresh mode in response to the combination not exceeding the predefined threshold.

2. The method of claim 1, further comprising placing clocks, control signals, clock trees, DLLs, or other unnecessary logic/circuits in power down mode in response to the confirmation that there are no memory access requests.

3. The method claimed in claim 1, wherein the power savings state comprises a C2 power savings mode.

4. The method claimed in claim 1, wherein the predefined threshold covers a maximum exit latency for memory to come out of self-refresh.

5. The method claimed in claim 4, comprising accessing parameters of the isochronous and bus master data; and using the parameters to precompute whether powerdown mode exit latencies fall within the predefined threshold.

6. The method claimed in claim 5, wherein accessing parameters of the isochronous and bus master data comprises using a bios/driver to access the parameters.

7. The method claimed in claim 6, comprising representing the computation by coding of memory-controller configuration registers or state machines controlling power-down modes.

8. The method claimed in claim 4, comprising:
   computing the maximum powerdown exit time in accordance with: maximum powerdown exit time=self refresh exit time+exit time implementation overhead/inefficiencies+applicable fraction of DLL powerdown exit time.

9. The method claimed in claim 8, wherein a display latency tolerance is determined in accordance with FIFO size, and display mode requirements.

10. The method claimed in claim 9, wherein the display latency tolerance is greater than the maximum powerdown exit time.

11. The method claimed in claim 10, wherein an isochronous latency tolerance is determined by FIFO size and minimum periodicy interval requirements.

12. The method claimed in claim 11, wherein the isochronous latency tolerance is greater than the maximum powerdown exit time.

13. A system comprising:
   a processor having a power saving state;
   a memory to be coupled to the processor; and
   power management logic to automatically transition the memory into a self-refresh mode in response to the processor being in the power savings state when there are no outstanding memory requests;
   wherein the power management logic keeps isochronous data updated and bus master data serviced when the memory is in the self-refresh state; and wherein the power management logic is to determine whether a combination of isochronous and bus master data exceeds a predefined buffering threshold and places the memory in the self-refresh mode in response to the combination not exceeding the predetermined threshold.

14. The system claimed in claim 13, wherein the power management logic places clocks or DLLs in power down mode in response to the processor being in the power savings state and when there are no outstanding memory requests.

15. The system claimed in claim 14, wherein the power savings state comprises a C2 power savings state.

16. The system claimed in claim 15, wherein the predefined threshold covers a maximum exit latency for the memory to come out of the self-refresh mode.

17. The system claimed in claim 16, wherein isochronous data includes display data.

18. The system claimed in claim 17, wherein the power management logic is to access parameters of the isochronous and bus master data, and use the parameters to precompute whether powerdown mode exit latencies fall within the predefined threshold.

19. The system claimed in claim 18, wherein the power management logic is to use a bios or driver to access the isochronous and bus master data parameters.

20. A chip, comprising:
a graphics and memory controller to transition an associated memory into a reduced power mode in response to no outstanding memory request and in response to an associated processor being in a power savings state, the graphics and memory controller to keep isochronous data updated when in the reduced power mode;
wherein placing the memory in the reduced power mode comprises determining whether a combination of isochronous and bus master data exceeds a predefined buffering threshold; and placing the memory into the reduced power mode in response to the combination not exceeding the predefined threshold.

21. The chip claimed in claim 20, wherein the graphics and memory controller places the memory in a self-refresh mode when placing it in the reduced power mode.

22. The chip claimed in claim 21, wherein the graphics and memory controller keeps bus master data serviced when the memory is in the reduced power mode.

23. A method for conserving power in an electronic device, comprising:
automatically placing a memory into a reduced power mode in response to no outstanding memory request and to a deterministic set of configurations being met;
wherein placing the memory into the reduced power mode includes placing the memory into a self-refresh mode and placing clocks, control signals, clock trees, DLLs, or other logic/circuits associated with the memory into a power-down mode, and wherein isochronous data is kept updated and bus master data is serviced when in the reduced power mode; and
wherein placing the memory in the self-refresh mode comprises determining whether a combination of isochronous and bus master data exceeds a predefined buffering threshold; and placing the memory into the self-refresh mode in response to the combination not exceeding the predefined threshold.

24. The method claimed in claim 23, wherein the memory is placed in the reduced power mode when an associated processor is in a C2 power savings mode.

25. The method claimed in claims 23, wherein the predefined threshold covers a maximum exit latency for the memory to come out of the self-refresh mode.

26. The method claimed in claim 25, wherein the isochronous data includes display data.

27. The method claimed in claim 25, wherein determining whether the combination of isochronous and bus master data exceeds the predefined buffering threshold comprises accessing parameters of the isochronous and bus master data, and using the parameters to precompute whether reduced power mode exit latencies fall within the predefined threshold.

* * * * *